Nov. 17, 1970    R. A. KANTOLA ETAL    3,540,268
OPEN-LOOP FLUIDIC ANALOG ACCELEROMETER
Filed May 29, 1967    2 Sheets-Sheet 1
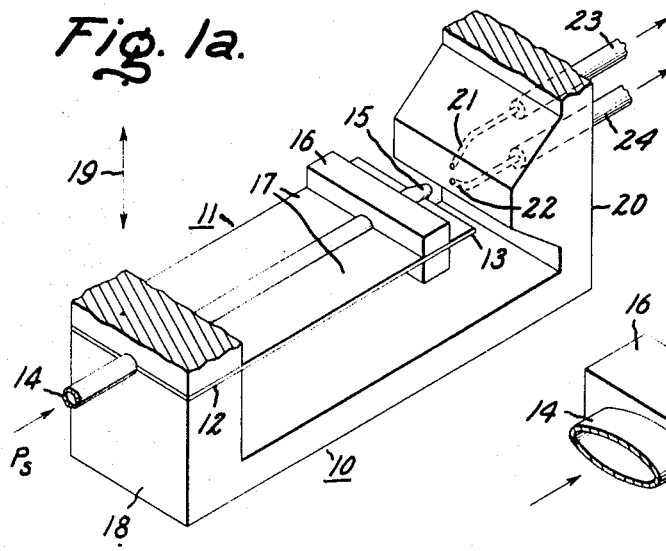
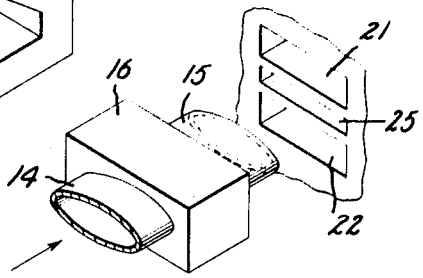
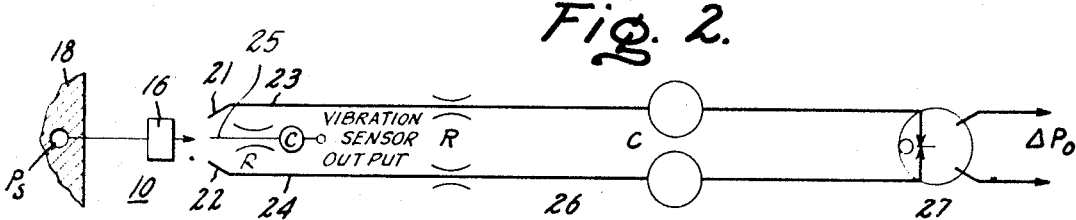
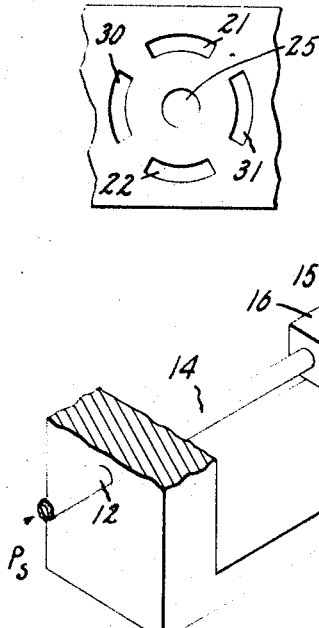
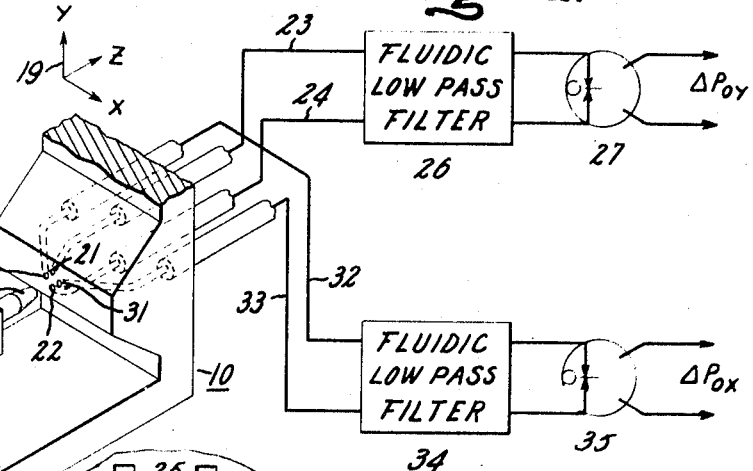
Inventors:
Robert A. Kantola,
Willis A. Boothe,
by Louis A. Moucha United States Patent Office 3,540,268
Patented Nov. 17, 1970

3,540,268
OPEN-LOOP FLUIDIC ANALOG ACCELEROMETER
Robert A. Kantola and Willis A. Boothe, Scotia, N.Y., assignors to General Electric Company, a corporation of New York
Filed May 29, 1967, Ser. No. 642,116
Int. Cl. G01p 15/02; G01h 1/04
U.S. Cl. 73—71                                            4 Claims

ABSTRACT OF THE DISCLOSURE

Apparatus for sensing acceleration or vibration and generating an analog-type pressurized fluid signal proportional to the magnitude of the associated event. Linear acceleration or vibration is sensed by a flexure-mounted inertial mass including a hollow, elongated spring member of the cantilever beam type having a first end rigidly fixed in position and a second unsupported end upon which the acceleration-sensitive inertial mass is mounted. The hollow portion of the spring member issues a fluid jet from the second unsupported end directed at fluid receivers, the flexure of the spring member causing distribution of the jet between the receivers in proportion to the magnitude of the acceleration. Angular motion acceleration is sensed by utilizing a cylindrical inertial mass connected along its longitudinal axis to two torsional spring members rigidly fixed in position at their far ends such that the cylindrical mass is subject to rotation in the presence of an angular motion acceleration.

CROSS-REFERENCE DATA TO RELATED APPLICATION

A concurrently filed U.S. patent application, Ser. No. 642,115, inventors J. N. Shinn and C. G. Ringwall, entitled "Closed-Loop Fluidic Analog Accelerometer" is assigned to the same assignee as the present invention and discloses and claims a closed-loop embodiment of the subject open-loop fluidic analog accelerometer.

Our invention relates to a fluidic type of accelerometer providing an analog output, and in particular, to a friction-free, open-loop, fluidic accelerometer having a flexure-mounted means for sensing linear or angular motion acceleration to thereby provide a highly reliable accelerometer.

Accelerometers are devices for sensing the magnitude of particular acceleration events and find typpical application in guidance and navigation systems for high performance aircraft in which their output is applied to other mechanisms for further computational or control functions, or for direct reading of the acceleration event. Prior art accelerometers are relatively complex structures having several moving parts subject to sliding motion and resultant frictional wear or other type of frictional motion which inherently causes degradation of the performance or actual failure of the accelerometer. The recently developed fluidics field employing no-moving parts devices known as fluid amplifiers offers promise of improved types of accelerometers having simplified structure and substantially unlimited lifetime. A prior art fluidic accelerometer employs as liding piston supported by an air bearing in a cylinder filled with a suitable fluid for sensing acceleration by the motion of the piston responsive to the acceleration event, and fluid amplifier circuitry for merely amplifyfing the fluid signals picked off from the piston-cylinder arrangement. Although the air bearing reduces friction, it requires high precision, close-fitting parts which inherently are susceptible to contamination and warpage. Thus, the advantages of fluid amplifiers in their capability of withstanding extreme environmental conditions such as shock, vibration, nuclear radiation and high temperature and their no-moving parts feature which permits substantially unlimited lifetime cannot be utilized with this prior arm accelerometer since the acceleration-sensing element fails long hefore any possible failure of the fluid amplifier circuitry associated therewith.

Therefore, one of the principal objects of our invention is to provide a new fluidic analog-type accelerometer having a friction-free acceleration sensing portion constructed of parts not requiring high precision to thereby utilize the full advantage of fluid amplifiers associated therewith.

Another object of our invention is to provide the accelerometer for sensing one-axis or two-axes linear motion acceleration.

A further object of our invention is to provide such accelerometer for sensing angular motion acceleration.

A still further object of our invention is to provide an open-loop fluidic accelerometer.

Briefly summarized, our invntion is a new open-loop fluidic analog-type accelerometer. The sensor element of the accelerometer is comprised of a spring-mass device in the form of a flexure-mounted inertial mass responsive to the acceleration event which may be of the linear or angular motion type. In the case of the linear motion accelerometer, the spring-mass device comprises a hollow, elongated spring member of the cantilever beam type having a first end rigidly fixed in position about which the spring member flexure occurs, and a second unsupported end upon which the acceleration-sensitive inertial mass is mounted and rigidly attached thereto. The hollow portion of the spring member serves as a fluid passage wherein the fixed end thereof is supplied with a pressurized fluid and a fluid jet issues from the mass-mounted end. A pair of spaced fluid receivers are positioned coplanar with a selected axis along which the spring member is constrained to flex such that the fluid jet issuing therefrom is directed midway between the receivers in the nonflexed state of the spring member and is distributed between the receivers in a proportion varying with the magnitude of the acceleration event along the selected axis. The analog fluid signal developed by the differentially pressurized fluid recovered in the two receivers may be supplied to the fluid amplifier circuitry for generating a signal of sufficient pressure level for further utilization thereof in a system in which the accelerometer is a component. One-axis linear motion acceleration is sensed by construction of the spring member for stiffness in a lateral direction such that the only flexure is coplanar with the selected axis determined by the position of the fluid receivers. Two-axis linear motion acceleration is sensed by providing a second pair of fluid receivers positioned coplanar with a second selected axis generally perpendicular to the first axis associated with the first pair of receivers. The angular motion accelerometer embodiment of our invention comprises a cylindrical acceleration-sensitive mass attached along its longitudinal axis to two torsional spring members rigidly fixed in position at their far ends such that the cylindrical mass is subject to rotation in the presence of an angular acceleration event. A fluid jet in communication with the cylindrical mass is sensed by two receivers for developing a differentially pressurized analog fluid signal representing the magnitude of the angular motion acceleration event in a manner similar to that of the one-axis linear motion acceleration sensor.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same reference character, and wherein:

FIGS. 1a and 1b are respective views, partly in section, of two embodiments of the acceleration-sensitive portion of a one-axis linear motion accelerometer constructed in accordance with our invention;

FIG. 2 is a schematic diagram of the one-axis linear motion accelerometer partially illustrated in FIG. 1;

FIG. 3a is a two-axis embodiment of the linear motion accelerometer of FIGS. 1 and 2 and further illustrates;

FIGS. 3b and 3c are enlarged views of two other types of fluid receivers that may be employed.

Figure 4A:
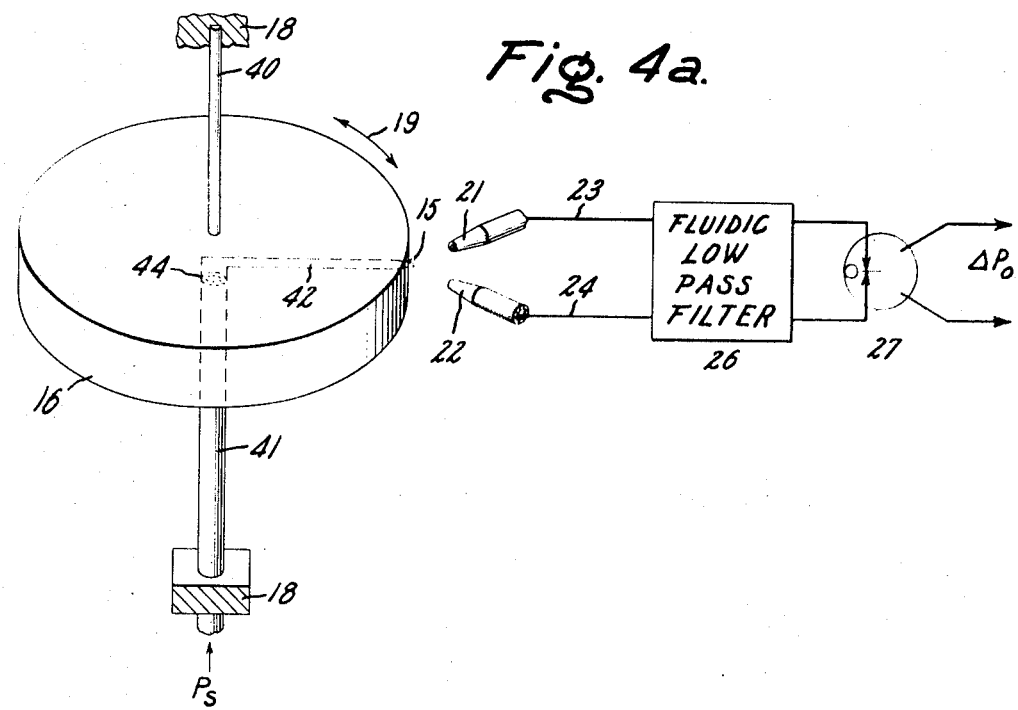
FIGS. 4a and 4b illustrate two embodiments of the acceleration-sensitive portion of an angular motion accelerometer constructed in accordance with our invention.

Referring now to the drawings, in FIG. 1a there is shown, partly in section, a one-axis linear motion acceleration sensor 10 comprising the spring-mass and receiver portion of our linear motion fluidic analog accelerometer. The spring-mass device is in the form of a flexure-mounted inertial mass comprising a resiliently flexible, elongated body 11 of the cantilever beam type having a first end 12 thereof rigidly fixed in position and a second unsupported end 13 upon which a body comprising an acceleration-sensitive (inertial) mass 16 is mounted and rigidly attached thereto. Bodies 11 and 16 may be distinct or one integral body. Body 11, hereinafter also described as a spring member, is provided with a hollow center portion running longitudinally of the spring member to form a fluid passage 14 therethrough. Body 16 may have any of a number of forms, but preferably is symmetrical about the plane of motion. A first end 14a of the fluid passage is adapted for connection by any suitable means to a source of fluid $P_s$ pressurized above ambient, and which may be a liquid or gas including air. The second end 15 of fluid passage 14 is the form of a fluid flow restrictor or nozzle for generating a jet of the pressurized fluid which issues in a straight path aligned with the longitudinal axis of passage 14 in the region of the second end 15 thereof. Mass 16 is positioned in a plane perpendicular to the axis of fluid passage 14 when spring member 11 is in its nonflexed state and may be positioned in proximity with the second end 13 thereof, as illustrated, or at the very extreme end and integral therewith. For the case of the one-axis linear motion acceleration sensor, spring member 11 further includes a fin structure 17 integral with the hollow member 14 and mass 16, and is also rigidly fixed in position at the supported end 12 to provide stiffness in the lateral direction such that spring member 11 is constrained to be resiliently flexible as a cantilever beam along only a single axis perpendicular to the plane including fin member 17 in the nonflexed state of spring member 11. It is appreciated that the unsupported end 13 of member 11, and thus also mass 16, are constrained to move in a path which is a segment of an arc at whose null point the tangent to the path is in the direction along the axis in which acceleration is to be sensed, however, the degree of movement of unsupported end 13 and mass 16 is relatively small and spring member 11 is of elongated form such that as a good approximation the movement can be considered to be linear along the sensitive axis.

A housing for supporting the spring-mass device is a structurally rigid open frame 18 rigidly fixed in position, such as by attachment to an aircraft structure subject to the external acceleration event being sensed, and oriented preferably such that the nonflexed state of spring member 11 is perpendicular to the axis of the single-axis linear motion acceleration event being sensed. Thus, in the illustration of FIG. 1a, frame 18 is positioned such that spring member 11 in the nonflexed state is oriented perpendicular with respect to the linear motion acceleration axis indicated by arrows 19. Member 11 is resiliently flexible about the supported end 12 in response to the linear acceleration event 19 wherein "resiliently flexible" is defined as the characteristic of member 11 flexing in the manner of a loaded cantilever beam in response to the acceleration event and returning to its nonflexed state in a subsequent absence of the acceleration. Frame 18 includes a second portion 20 for containing two spaced fluid receivers 21 and 22 positioned coplanar with the selected axis 19 downstream of nozzle 15 such that in the nonflexed state of member 11 the fluid jet issuing from nozzle 15 is directed midway between the two receivers to thereby provide equal pressurized fluid signals in two fluid passages 23 and 24 which are connected to the outputs of receivers 21 and 22, respectively. The distance between the nozzle end 15 and downstream receivers 21, 22 determines the sensitivity (gain) of the acceleration sensor and such distance may be in the range of 1 to 20 times the smallest nozzle exit dimension. Within this range of spacings, the fluid jet is assumed to have minimum divergence in its path from the nozzle to the receivers, and the sensitivity increases with decreased nozzle-to-receiver spacing. Thus, in the absence of an acceleration event having at least a component along axis 19, the differentially pressurized fluid signal developed between passages 23 and 24 by the fluid pressure recovered in the receivers is zero. Passages 23, 24 and all the other fluid passages interconnecting elements of our accelerometer are of circular cross section, or other shapes as desired, constructed of a material compatible with the fluid medium employed. It is noted that none of the elements of our accelerometer are constructed as high precision parts.

Now assume that a linear motion acceleration event or component thereof develops along the indicated axis 19. Under this condition of acceleration which is assumed a linear motion acceleration, although it is recognized that a tangential component of angular motion acceleration can also be sensed, spring member 11 flexes in the manner of a loaded cantilever beam, and in particular, the unsupported end 13 of member 11 flexes due to the mass-acceleration force $F=ma$ being developed by mass $(m)$ 16 accelerating along axis 19 in the same direction as frame 18 accelerates but in an opposing direction relative to the null point midway between the receivers. This mass-acceleration force is opposed by the resiliency(spring rate)force of member 11 tending to return mass 16 to its null (zero acceleration) position, and the steady-state position of mass 16 is determined by a balance of these forces. The magnitude of the displacement of end 13 (and mass 16) from its nonflexed (null) position is directly proportional in a linear relationship to the magnitude of the acceleration event along axis 19. In the event of a constant acceleration event, member 11 attains the state of flexure proportional to the magnitude of the acceleration and remains in such state for the duration of the constant acceleration. The motion of mass 16 from its null position to a steady-state position displaced from the null corresponding to a constant acceleration event may be somewhat oscillatory or without any overshoot depending upon the mechanical damping provided in the spring-mass device. A mechanical damping factor in the range of 0.20 to 0.70 for the structure illustrated in FIG. 1a is preferably employed in our open-loop accelerometer. The mass of hollow member 14 and fin member 17 is made as small as possible, such that the primary acceleration-sensitive body, mass 16, has a mass greater than the total mass of members 14 and 17 by a ratio of at least 5:1. Although the cross section of the fluid passage within hollow member 14 is illustrated as being circular, it may be of other shapes such as rectangular or elliptical, and, as illustrated in FIG. 1b, the elliptical cross section of hollow member 14 may be sufficiently stiff laterally to omit the need for providing fin members 17 as in the case of the FIG. 1a embodiment. In addition, the circular shaped receivers indicated in FIG. 1a may also have other shapes such as the rectangular illustrated in enlarged nozzle-receiver FIG. 1b. A center vent passage 25 may also be provided, if desired, intermediate receivers 21 and 22.

A specific example of the dimensions of our one-axis linear motion accelerometer sensor having as the spring member 11 a hollow reed of rectangular cross section, and constructed of 0.005 inch steel follows: The reed is 2 inches long having outside dimensions of 0.030 inch (height) by 0.210 inch (width). The nozzle-to-receiver spacing is 0.200 inch, equal to ten times the reed inside height dimension. The receivers each have a height dimension equal to the inside height dimension of the reed, and are spaced apart by a center vent as illustrated in FIG. 1b, having a dimension equal to one-half a receiver height dimension. The weight of mass 16 is approximately 0.03 pound and the mass of the reed alone is approximately 5% of this amount. The deflection of the jet at the receivers for this specific sensor is 0.00905 inch per gravitational unit of acceleration (inch/G) wherein $G=32.2$ feet/second,$^2$ and the output differential pressure change per unit of deflection varies linearly with supply pressure for incompressible flow and is 16.5 p.s.i.d./inch/p.s.i. wherein p.s.i.d. is pounds per square inch differential. Thus, the sensor sensitivity is 0.281 p.s.i.d./G/p.s.i., and can be readily increased by increasing supply pressure $P_s$, within limits.

Our open-loop fluidic accelerometer is a satisfactory device for sensing acceleration but the flexure of spring member 11 and attendant movement of mass 16 may become relatively large for acceleration events having exceptionally large magnitudes, resulting in a nonlinear relationship between the position of mass 16 from null and the differential pressure signal developed in response thereto. The degree of mass 16 movement may, of course, be decreased by decreasing the weight of mass 16 or increasing the stiffness of member 11 along axis 19 at some expense in sensor sensitivity.

Our open-loop accelerometer is illustrated schematically in FIG. 2. A fluidic low pass filter 26 comprising a serially connected fluid resistor R and capacitor C effectively removes any high frequency components in the analog signal in each of passages 23, 24 due to the probably underdamped response of the flexure-mounted mass 16 in the case of compressible fluids. For incompressible fluids an inductor-resistor circuit is used as the filter. One or more stages of analog-type fluid amplifiers 27 are also preferably employed for amplifying the filtered signal to a level $\Delta P_o$ for further utilization thereof.

The single-axis fluidic accelerometer illustrated in FIGS. 1 and 2 may be converted to a two-axis linear motion accelerometer as illustrated in FIG. 3a in the following manner. The fin portion 17 for rendering spring member 11 stiff in the lateral direction is omitted and a resiliently flexible tube 14 preferably having a circular cross section is utilized as the spring member. The first end 12 of tube 14 is rigidly supported within portion 18 of the frame housing in its passage through the wall thereof such that tube is equally resiliently flexible in all directions. A second pair of spaced receivers 30 and 31 are positioned coplanar with a second selected axis herein designated $x$ which for purposes of exemplification is perpendicular to the first axis 19 herein designated $y$ along which the first pair of receivers 21 and 22 are positioned. The two pairs of receivers 21, 22 and 30, 31 are each equally spaced and define the two axes $x$, $y$ along which an external acceleration event is to be sensed. The four receivers are oriented such that in the nonflexed (null) state of spring member 14, the fluid jet issuing from nozzle 15 is directed centrally of the arrangement of four downstream receivers and distributed equally thereamong, or vented to a central vent (not shown), to provide equal pressurized fluid signals in the four passages 23, 24, 32, 33 connected to the outputs of the receivers. Thus, in the absence of an acceleration event having at least a component within the $x$–$y$ plane, the $x$ and $y$-axis differential pressurized fluid signals developed between passages 32–33 and 23–24, respectively, are zero. A fluidic circuit 26, 27 which may be of the same type illustrated in FIG. 2 providing high frequency filtering and amplifying characteristics is connected to fluid passages 23 and 24 to provide a differentially pressurized $y$-axis output fluid signal $\Delta P_{oy}$. In like manner, fluid passages 32 and 33 are connected to a second fluidic circuit 34, 35 identical to circuit 26, 27 to develop at the output thereof a differentially pressurized $x$-axis output fluid signal $\Delta P_{ox}$.

Although the fluid receivers 21, 22, 30, and 31 in FIG. 3a are illustrated as being of circular shape, they may also have the shape illustrated in FIG. 3b, a sector of a ring, the advantage of this shape being that a lower output fluid impedance is obtained for suppyling greater output flow since the receivers intercept a greater portion of the fluid jet. A third arrangement of fluid receivers is illustrated in FIG. 3c comprising a cruciform arrangement of twelve receivers. The twelve receivers are in four groups, each comprising three receivers interconnected at their outputs for supplying the four fluid passages leading to the two fluidic filter circuits 26, 34. The interconnected receivers in each group are indicated by the numerals designating the four receivers in FIGS. 3a and 3b. Center vents 25 can be used with each of the receiver arrangements illustrated in FIGS. 3b and 3c, if desired.

Figure 4B:
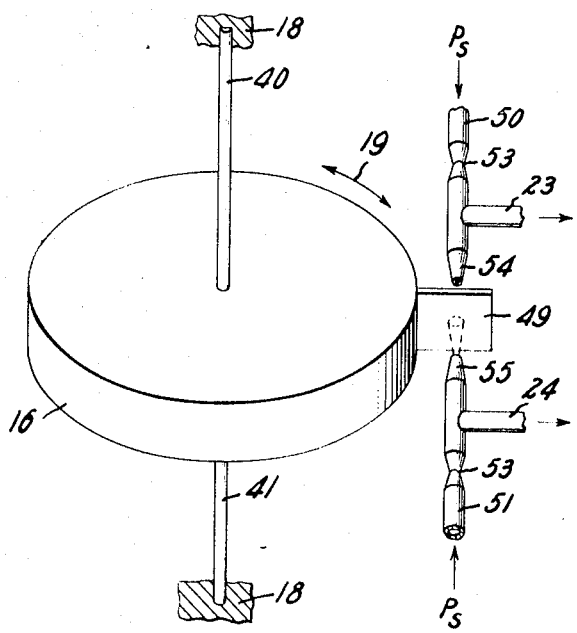

Fluid analog accelerometers for sensing angular motion acceleration and being friction-free in operation and constructed of parts not requiring high precision are illustrated in FIGS. 4a and 4b. In both of FIGS. 4a and 4b, as in the case of the linear motion accelerometer, the acceleration-sensitive portion of the accelerometer comprises a flexure-mounted inertial mass. In the case of our angular motion accelerometer, the inertial mass is a cylindrical body 16 of mass $m$ rigidly attached to and supported along its longitudinal axis by the near ends of two aligned torsionally resilient members 40 and 41 having their far ends rigidly fixed in position to frame member 18. Torsionally resilient members 40 and 41 may comprise tubes of the type 14 illustrated in FIG. 3a, preferably proportioned for greater stiffness in bending than in torsion. Mass 16 thus undergoes a resiliently rotational motion about its axis in response to an angular motion acceleration event 19 which occurs about such axis in a plane perpendicular or substantially perpendicular thereto.

Referring now in particular to FIG. 4a, mass 16 is provided with a hollow center portion 42 which forms a fluid passage preferably circular in cross section, although other shapes may also be utilized, extending along the longitudinal axis of mass 16 from the bottom end thereof to approximately the center and thence extending radially outward and terminating in a nozzle shape 15. A pair of spaced fluid receivers 21 and 22 are positioned in the plane of rotation of mass 16 and oriented such that in the null position of mass 16, wherein members 40 and 41 are in their torsionally nonflexed state, a fluid jet issuing from nozzle 15 is directed midway between the downstream two receivers to thereby provide equal pressurized fluid signals in two fluid passages 23 and 24 connected with the outputs of receivers 21 and 22, respectively. Torsionally resilient member 41, being hollow, also provides a fluid passage interconnecting passage 42 to a source of pressurized fluid $P_s$, passage 41 illustrated as being coupled in fluid-tight relationship with passage 42 in region 44. The differentially pressurized fluid signal between passages 23 and 24 is supplied to the input of a fluidic circuit 26 which may be of the same type as illustrated in FIG. 2 to filter out any high frequency components, and one or more stages of analog fluid amplification 27 may also be utilized. The operation of our angular motion accelerometer may be described as follows: Under conditions of zero angular motion acceleration, the pressures recovered in receivers 21 and 22 are equal such that the differentially pressurized fluid signal developed between passages 23 and 24, and the output differential pressure signal $\Delta P_0$ are both zero. Under conditions of an angular motion acceleration of frame 18 along path 19, the acceleration torque due to mass 16 being subjected to rotational acceleration causes torsional spring members 40, 41 to be flexed by twisting in the same direction as frame 18 accelerates but in an opposing direction relative to the null point midway between the receivers. The flexure of members 40, 41 and relative rotation of mass 16 is of magnitude directly proportional in a linear relationship to the magnitude of the angular acceleration along path 19. Counteracting the acceleration torque is the "resiliency" torque of members 40, 41 tending to return mass 16 to its null position. A balance of the acceleration torque and resiliency torque determines the steady-state angular position of mass 16 for constant acceleration.

Referring now to FIGURE 4b, there is shown a second embodiment of the angular acceleration sensing portion of the angular motion accelerometer illustrated in FIGURE 4a. The distinction between the two embodiments is the means for supplying the differentially pressurized fluid signal to the input of passages 23 and 24 which are connected to the input of fluid circuit 26. In the FIG. 4b embodiment, torsionally resilient member 41 does not provide the additional function of a fluid passage as in the case of the FIG. 4a embodiment, nor is there any need for a hollow portion within mass 16.

In the FIG. 4b embodiment, a pair of fluid passages 50 and 51 supplied from a source of pressurized fluid $P_s$ each include a fluid flow restrictor 53 and terminate in aligned nozzles 54 and 55, respectively, positioned within the plane of rotation of mass 16 and perpendicular with a protruding member 49 rigidly fixed to mass 16 radially therewith. Nozzles 54, 55 are equally spaced from member 49 at the null position of mass 16. Fluid passages 23 and 24 which are connected to the input of fluidic circuit 26 (not shown) are connected to passages 50 and 51, respectively, intermediate the fluid flow restrictor 53 and nozzle ends thereof. The operation of the acceleration sensor in FIGURE 4b may be briefly described as follows: Under conditions of zero angular acceleration, nozzles 54 and 55 are equally spaced from member 49 and thus the back pressure developed in passages 23 and 24 due to the effect of the fluid jets impinging upon member 49 in the presence of fluid flow restrictors 53 is equal in each of passages 23 and 24 such that the differential signal therebetween is zero. Under conditions of an angular motion acceleration, mass 16 undergoes a rotational motion about its axis proportional to the magnitude of the external acceleration in the plane of mass 16, resulting in spring members 40 and 41 developing a flexure torque in the same direction as the external angular motion acceleration event 19 but in an opposing direction relative to the null point. The rotational motion of mass 16 causes member 49 to more closely approach one of the nozzles 54 and 55. Thus, assuming that the external angular motion acceleration event 19 is in a clockwise direction, the rotational motion of mass 16 is counterclockwise relative to the frame 18 thereby developing a larger magnitude back pressure in passage 23 and a correspondingly smaller back pressure in passage 24. This difference in back pressures is the differentially pressurized fluid signal applied to fluidic circuit 26 and results in filtered, amplified output signal $\Delta P_0$ at the output of circuit 26 as in FIG. 4a.

From the foregoing description, it can be appreciated that our invention makes available a new open-loop fluidic analog accelerometer which is friction-free in operation, and is constructed of parts not requiring high precision such that the full advantage of the highly reliable fluid amplifiers used in our apparatus and in circuits connected to the output thereof, may be utilized. Our accelerometer may be of the one-axis or two-axis linear motion accelerometer type or angular motion accelerometer type each providing an analog-type fluid output signal. The acceleration-sensitive portion of our accelerometer being comprised of a flexure-mounted inertial mass responsive to the accleration event is of relatively simple construction and provides a highly reliable device.

Having described several embodiments of our open-loop fluidic analog accelerometer, it is believed obvious that modification and variation of our invention is possible in the light of the above teachings. Thus, additional or other fluid amplifier circuitry may be utilized in fluidic circuits 26, 27 as desired. Our accelerometer may also be utilized as a vibration sensor wherein frame 18 is rigidly attached to a structure undergoing vibration. When used as a vibration sensor, a filtered output of the center vent 25 is the output signal. It can be seen in FIG. 2 that, as vibration amplitude increases, this filtered output decreases proportionally over the output range of the vibration sensor. This principle can be applied to the sensing of single or double axis linear vibrations or to torsional vibrations using the aforementioned configurations. Obviously, the design parameters such as damping ratio and specific dimensions may be different for our apparatus when used as a vibrator sensor but the physical appearance could be the same, and functionally would be identical except for the fact that the center vent is now monitored. This vibration sensor is also considered to be within the scope of our invention. Finally, it should be obvious that various shapes of the spring members and inertial masses other than that illustrated may also be employed and that such elements may be constructed from a variety of materials dictated by the environment. It is, therefore, to be understood that changes may be made in the particular embodiments of our invention as described which are within the full intended scope of the invention as defined by the following claims.

What we claim as new and desire to secure by Letters Patent of the United States is:

1. An open-loop fluidic analog-type accelerometer comprising inertial mass means for sensing a selected external acceleration event and generating an analog-type pressurized fluid signal proportional to the magnitude of the sensed acceleration event wherein an inertial mass portion of said means remains in a predetermined null position in the absence of the acceleration event and is movable therefrom in the presence of such acceleration event, and spring means for supporting the inertial mass portion, the force resulting from said mass portion accelerating in response to the external acceleration event causing flexure of said spring means and motion of the inertial mass portion relative to the null position in a direction opposing the external acceleration event, the steady-state displacement of said inertial mass portion from the null position being proportional to the magnitude of a constant magnitude external acceleration event, and further comprising fluid receiver means aligned with the predetermined null position of said inertial mass portion for monitoring the analog-type pressurized fluid signal in the region of the predetermined null position wherein the average magnitude of the monitored signal decreases proportionally with increased amplitude of vibration of said inertial mass portion.

2. The fluidic sensor set forth in claim 1 and further comprising
  means for filtering the monitored signal to thereby obtain a pressurized fluid output signal having a magnitude varying inversely with the vibration amplitude.

3. A fluidic analog-type vibration sensor comprising
  inertial mass means comprising a body movable along at least one selected axis along which a vibration event is to be sensed and in response thereto,
  spring means comprising a resiliently flexible member for supporting the inertial body, said spring member having a first end thereof rigidly supported in position about which the spring member flexure occurs and a second end providing rigid attachment for the vibration-sensitive inertial body, said spring member provided with a fluid passage therethrough,
  means for supplying pressurized fluid to a first end of said fluid passage, the second end of said fluid passage adapted for emission of a fluid jet therefrom, and
  means rigidly fixed to a device undergoing the vibration event and comprising a first portion for providing the rigid support for said spring member about which the flexure occurs, and a second portion having a fluid receiver oriented downstream of the second end of said fluid passage and at the null position of said inertial body whereby the fluid jet issuing from the second end of said fluid passage is directed into the center of the receiver in the nonflexed state of said spring member and is moved relative to the center position during the vibration event for generating an analog-type pressurized fluid signal having an average magnitude varying inversely with the vibration amplitude.

4. The fluidic vibration sensor set forth in claim 3 and further comprising
  means for filtering the pressurized fluid signal generated at the output of said receiver to thereby obtain a pressurized fluid output signal having a magnitude varying inversely with the vibration amplitude.

References Cited

UNITED STATES PATENTS

| | | | |
|---|---|---|---|
| 2,332,994 | 10/1943 | Draper et al. | 73—516 XR |
| 2,682,003 | 6/1954 | Stubner | 73—517 XR |
| 3,023,626 | 3/1962 | Bonnell | 336—30 XR |
| 3,153,346 | 10/1964 | Quirmbach | 73—516 XR |
| 3,224,279 | 12/1965 | Galli et al. | 73—517 |
| 3,201,999 | 8/1965 | Byrd | 73—515 |

FOREIGN PATENTS 669,829  1/1939  Germany.

JAMES J. GILL, Primary Examiner

U.S. Cl. X.R.

73—515